United States Patent [19]

Fraas et al.

[11] Patent Number: 5,651,838
[45] Date of Patent: Jul. 29, 1997

[54] HYDROCARBON FIRED ROOM HEATER WITH THERMOPHOTOVOLTAIC ELECTRIC GENERATOR

[75] Inventors: Lewis M. Fraas, Issaquah; James E. Avery, Fall City; John E. Samaras, Seattle, all of Wash.

[73] Assignee: JX Crystals Inc., Issaquah, Wash.

[21] Appl. No.: 572,736

[22] Filed: Dec. 14, 1995

[51] Int. Cl.$^6$ ............... H02N 6/00; H01L 31/058
[52] U.S. Cl. ............................................. 136/253
[58] Field of Search ................................. 136/253

[56] References Cited

U.S. PATENT DOCUMENTS

| | | | |
|---|---|---|---|
| 4,707,560 | 11/1987 | Hottel et al. | 136/253 |
| 4,776,895 | 10/1988 | Goldstein | 136/253 |
| 4,906,178 | 3/1990 | Goldstein et al. | 431/79 |
| 4,976,606 | 12/1990 | Nelson | 431/79 |
| 5,312,521 | 5/1994 | Fraas et al. | 136/253 |
| 5,356,487 | 10/1994 | Goldstein et al. | 136/253 |
| 5,383,976 | 1/1995 | Fraas et al. | 136/253 |
| 5,389,158 | 2/1995 | Fraas et al. | 136/244 |
| 5,401,329 | 3/1995 | Fraas et al. | 136/253 |
| 5,403,405 | 4/1995 | Fraas et al. | 136/253 |
| 5,439,532 | 8/1995 | Fraas | 136/253 |
| 5,512,109 | 4/1996 | Fraas et al. | 136/253 |

*Primary Examiner*—Aaron Weisstuch
*Attorney, Agent, or Firm*—James Creighton Wray

[57] ABSTRACT

A hydrocarbon fired room heater with thermophotovoltaic electric generator has high power outputs without cell overheating and failure. The unit includes a burner for generating a hydrocarbon flame, a catalytic emitter positioned in the hydrocarbon flame for emitting infrared radiation when heated by the flame, a receiver positioned around the catalytic emitter for receiving the infrared radiation and for converting the infrared radiation to electric power, an exhaust chimney positioned adjacent the receiver, and air draw ducts having uncovered tops, upper parts, and lower parts and positioned adjacent the chimney and the receiver for directing heat up and away from the receiver. The chimney is positioned directly above the top edge of the receiver, and the air draw ducts are positioned adjacent the receiver and chimney for defining air draw channels. Each air draw duct is a generally U-shaped member having a pair of side walls and a boundary wall extending between the side walls. The side walls of the upper part of each air draw duct are connected to the chimney and the side walls of the lower part of the first air duct extends around the heat sinks of the first circuit and the lower part of the second air duct extends around the heat sinks of the second circuit. The burner is a gas-fired, wall-mounted heater having a fuel/air mixing tube and multiple flame ports. The emitter is v-shaped and opens downward towards the burner.

25 Claims, 1 Drawing Sheet

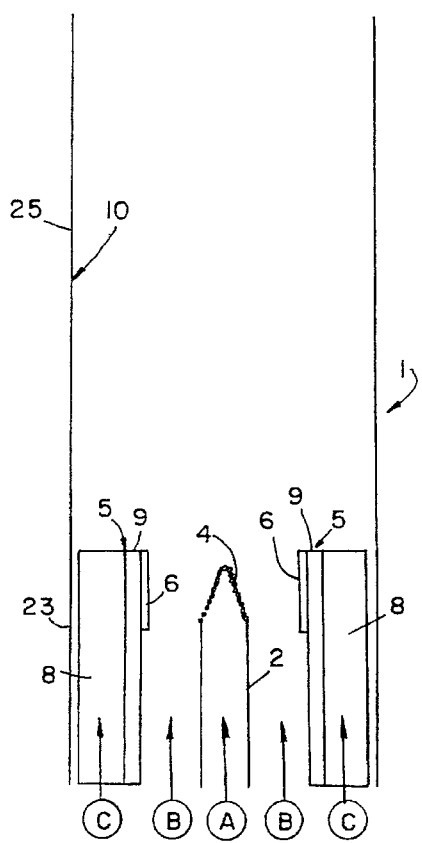
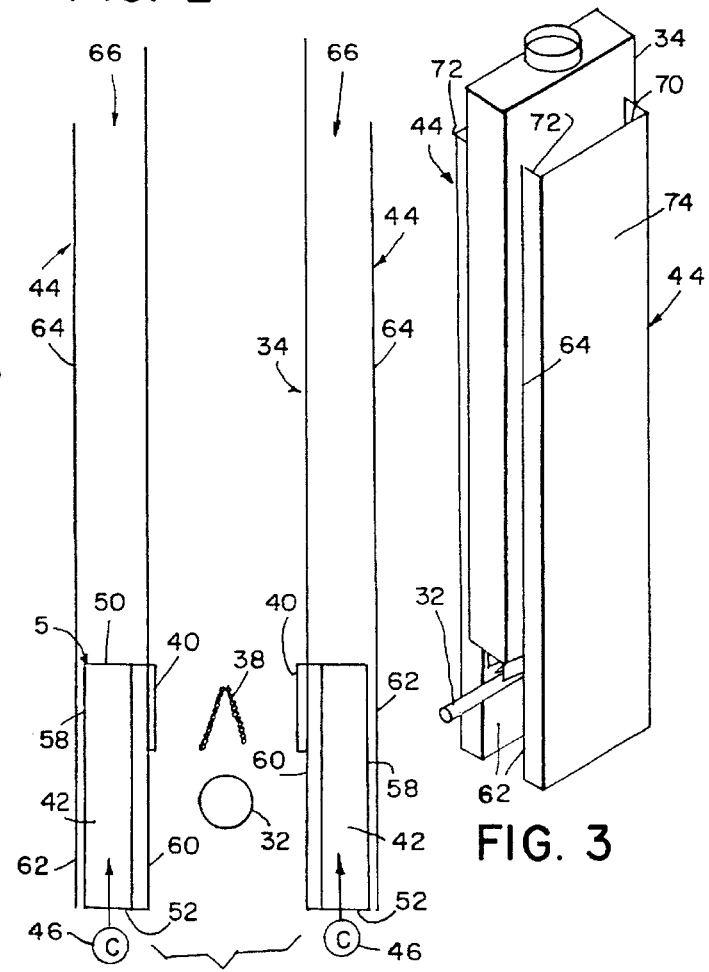
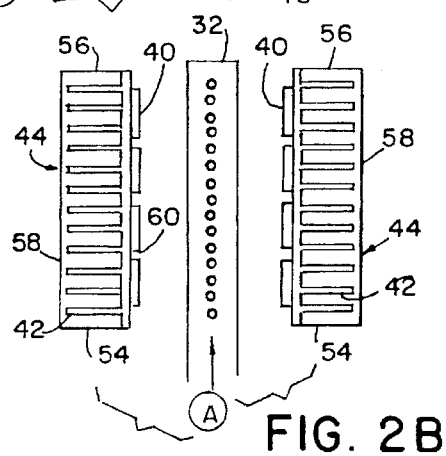
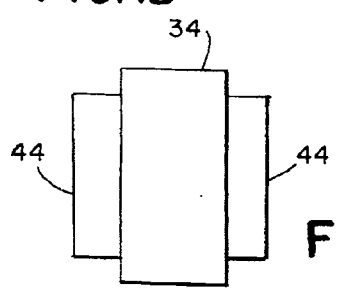

HYDROCARBON FIRED ROOM HEATER WITH THERMOPHOTOVOLTAIC ELECTRIC GENERATOR

BACKGROUND OF THE INVENTION

This invention relates to thermophotovoltaic power generators for converting fuel to electricity using no moving parts.

In our previously issued patents thermophotovoltaic generators for high efficiency conversion of fuel energy into electrical energy have been described. While useful for some applications, those generators primarily generate lower power outputs. Needs exist for generators having higher power outputs.

Heat removal is a critical concern with thermophotovoltaic generators. In the conversion of infrared radiation to DC electric power, the thermophotovoltaic cells produce substantial heat. That heat flows from the cells and into heat sinks, where the heat is ultimately removed by convective air cooling. At high power levels, however, that heat removal is inadequate, and overheating results. Needs exist for high power output generators having improved heat removal capabilities.

SUMMARY OF THE INVENTION

Propane and natural gas fired wall-mounted room heaters are included in many homes and buildings for space heating. Needs exist for electrical power generators that are easily retrofitted on existing room heaters, that have commercially attractive power outputs and that are not prone to overheating or failure.

A hydrocarbon thermophotovoltaic electric generator provides for high power output, enhanced heat removal and space heating.

The generator includes a burner, a catalytic emitter, a receiver with thermophotovoltaic cells positioned around the emitter, and an exhaust chimney near the receiver. The chimney funnels hot exhaust gases away from the emitter and receiver and simultaneously produces additional air draw at the base of the burner. That additional air draw increases electric power generation through the creation of higher temperature burns and increased infrared output. That air draw also creates more upward cool air currents that pass on all sides of the receiver, thereby reducing the hot gas heat flow to the cells and improving heat sink efficiency. Receiver cell heat sinks are positioned in air streams urged upward by the chimney, further cooling the cells and permitting greater power outputs.

Air draw ducts are included in the present invention for further increasing efficiency and improving heat removal. The ducts effectively draw cool air in from below the base of the generator and return heated air to the room. The ducts are positioned around the receiver and extend upward outside the walls of the chimney. Air channels are created between the walls of the chimney and the ducts. Heat from the thermophotovoltaic cells of the receiver passes through the cooling fins which extends into the air draw ducts. The heat meets a high velocity air flow being pulled upward through the ducts from below the burner. The heated air rises via natural convection and is further heated by contact with the exhaust chimney wall. The heated air exits the open top of the duct and heats the room.

The high velocity air flows drawn in through the bottoms of the ducts greatly increase cell cooling efficiency. That increased efficiency allows for an increase in thermophotovoltaic cell power density in the receiver, which in turn improves the generator as an economically viable alternative for electrical power generation.

A thermophotovoltaic generator apparatus includes a burner for generating a hydrocarbon flame, a catalytic emitter positioned in the hydrocarbon flame for emitting infrared radiation when heated by the flame, a receiver positioned around the catalytic emitter for receiving the infrared radiation and for converting the infrared radiation to electric power, and an exhaust chimney positioned adjacent the receiver. The chimney has a top end, a bottom end, an open top, and an open bottom.

In one preferred embodiment, the receiver is a flexible circuit of thermophotovoltaic cells having a first end, a second end, and multiple bending regions positioned between the first end and the second end. The first end is connected with the second end to form a continuous receiver extending completely around the emitter. The thermophotovoltaic cells are preferably GaSb cells, Ge cells, silicon cells, GaInAs cells, or GaInSbAs cells. The cells have an inner surface, an outer surface, and heat sinks connected to the outer surface. The heat sinks are preferably vertically finned aluminum extensions. The emitter is preferably a conical emitter or a v-shaped ribbon emitter and is either a platinum emitter, a platinum glazed alumina rod emitted, or a rare earth oxide selective emitter. The burner preferably includes a fuel/air mixing tube having at least one flame port and preferably multiple ports for creating a ribbon flame.

In one embodiment, the chimney extends around the receiver such that the heat sinks are surrounded by the lower end of the chimney, and the upper end extends above an upper edge of the receiver. Preferably, the generator includes at least one air draw duct having an uncovered top and positioned proximate the receiver for directing heat up and away from the receiver. The air duct has an upper part and a lower part, with the lower part positioned around the receiver and the upper part positioned around the chimney. A channel is formed between the chimney and the air duct that extends upward from a top edge of the receiver.

In another preferred embodiment of the present invention, the receiver has a top edge and a bottom edge and includes first and second circuits of thermophotovoltaic cells positioned on opposite sides of the emitter. The cells have inner surfaces, outer surfaces and heat sinks connected to the outer surfaces. The thermophotovoltaic cells are preferably GaSb cells, Ge cells, silicon cells, GaInAs cells, or GainSbAs cells. The emitter is preferably a v-shaped emitter opening downward towards the burner. The emitter has a first section and a second section. The first section faces a first row of thermophotovoltaic cells of the receiver and the second section faces a second row of thermophotovoltaic cells of the receiver. The emitter is preferably a platinum emitter, a platinum glazed alumina rod emitter, or a rare earth oxide selective emitter. The burner is a ribbon burner having a fuel/air mixing tube with multiple flame ports. The heat sinks are preferably finned aluminum extensions. The chimney is positioned directly above the top edge of the receiver.

In preferred embodiments,at least one air draw duct having an uncovered top is positioned proximate the receiver for directing heat up and away from the receiver. The chimney is positioned directly above the top edge of the receiver. Each duct has an upper part and a lower part, with the lower part of each duct positioned adjacent the outer surface of the receiver and the upper part positioned adjacent the chimney. A channel is defined between the chimney and the air draw duct and extends upward from the top edge of the receiver.

Each air draw duct is preferably a generally U-shaped member having a pair of side walls and a boundary wall extending between the side walls. The side walls of the upper part of each air duct is connected to the chimney and the side walls of the lower part extend adjacent opposite side edges of the receiver.

In a preferred embodiment of the present invention, the burner is a gas-fired, wall-mounted heater and the chimney is a wall-mounted exhaust chimney. First and second air draw ducts having uncovered tops, upper parts, and lower parts are positioned adjacent the chimney and receiver. The lower part of each duct is positioned adjacent the outer surface of the receiver and the upper part is positioned adjacent the chimney, thereby defining channels between the chimney and the air draw ducts that extend upward from the top edge of the receiver.

A method of electricity generation includes the steps of suspending a catalytic emitter above a flame port of a burner, positioning a receiver around the emitter, positioning a chimney above the receiver, producing a flame by combining hydrocarbon fuel and air in the burner, heating the emitter to produce infrared energy, collecting the infrared energy in the receiver, removing heat through cooling fins extending from the receiver, converting the infrared energy to DC electric power, and pulling exhaust gases generated by the heating step and air from beneath the burner up through the chimney. The pulling step further includes the steps of drawing air upward through the burner, lifting hot exhaust gases away from the receiver, and increasing velocities of air flows past the cooling fins. Air ducts are preferably positioned adjacent the chimney and the receiver for facilitating heat removal from the cooling fins.

These and further and other objects and features of the invention are apparent in the disclosure, which includes the above and ongoing written specification, with the claims and the drawings.

BRIEF DESCRIPTION OF THE DRAWINGS

FIG. 1A is a schematic elevation cross-section of a thermophotovoltaic generator having a chimney.

FIG. 1B is a plan view of a thermophotovoltaic generator having a chimney.

FIG. 2A is a schematic elevation cross-section of a room heater and thermophotovoltaic generator with a chimney and air draw ducts for cell cooling and room heating.

FIG. 2B is a partial schematic plan view of the burner cells, cooling fins, and air draw ducts.

FIG. 2C is a plan view showing a relationship of a chimney and air draw ducts for cell cooling and room heating.

FIG. 3 is a perspective view of the room heater and thermophotovoltaic generator having air ducts for cell cooling, as shown in FIG. 2A.

DETAILED DESCRIPTION OF THE PREFERRED EMBODIMENTS

Referring to the figures, FIGS. 1A and 1B schematically show a thermophotovoltaic electric generator 1 in which fuel and air are supplied through a fuel/air mixing tube 2. An infrared emitter 4 is heated by the combustion of the mixed fuel and air gases. Infrared radiation from the emitter 4 is absorbed by a receiver 5 including thermophotovoltaic cells 6 and is converted to DC electric power. Waste heat from the cells is removed by convective air flow past cooling fins 8. A layer 9 is positioned between the cells 6 and the cooling fins 8.

Experimentation with a Bunsen burner generator unit has shown that the unit can produce up to 2 Watts of electric power. Unfortunately, the cells 6 overheat at high power levels. However, that overheating problem is avoided by adding a chimney 10 to the unit. A unit operated with a chimney 10 produces 4 Watts, with the cells 6 actually running cooler than the 2 Watt unit without a chimney.

As shown in FIG. 1B, the receiver 5 can be a flexible circuit of thermophotovoltaic cells 6 having a first end 11, a second end 13 and multiple bending regions 15 positioned between the first end 11 and the second end 13. The first end 11 is connected with the second end 13 to form a continuous receiver extending completely around the emitter. The receiver 5 has an inner surface 17, an outer surface 19 and heat sinks 21 connected to the outer surface 19. The heat sinks are preferably finned aluminum extensions. As shown in FIGS. 1A and 1B, the chimney 10 extends around the receiver 5 such that the heat sinks 21 are encased by the lower end 23 of the chimney and the upper end 25 extends above an upper edge of the receiver 5.

The dramatic chimney effect is explained as follows. The hot exhaust gases in the chimney 10 produce additional air draw at the base of the burner. Additional air enters the regions A, B, and C. The additional air drawn in with the fuel at region A allows for a higher temperature burn, which in turn produces more infrared and thence more electric power from the cells. The additional cold air drawn in through region B lifts the hot exhaust gas plume away from contact with the cells, thereby reducing the hot gas heat flow to the cells. Finally, the hot gases in the chimney 10 create a higher convection cooling loop which increases the velocity of the air flow past the fins in region C, thereby improving the fin cooling efficiency.

FIGS. 2A, 2B, and 2C and FIG. 3 shows a simple commercial thermophotovoltaic power generator 1 developed by adding a thermophotovoltaic generator to the base of a propane or natural gas fired wall-mounted room heater. That unit is commercially attractive, as it can produce both heat and electricity. The unit is capable of producing large amounts of electricity while avoiding cell overheating.

Referring to FIGS. 2A, 2B, and 2C, a simple wall-mounted room heater includes a fuel/air supply tube 32 and a wall-mounted exhaust chimney 34. A row of holes 36 in the top of the supply tube 32 creates a ribbon flame. The exhaust gases heat the walls of the chimney 34, and the chimney walls in turn heat the air in the room. To add a thermophotovoltaic generator to the heater unit, an infrared emitter 38 is mounted in the ribbon flame, and circuits of cells 40 are located on either side of the emitter 38. Fins 42 behind the cells 40 transfer waste heat to the room air via convection. Air draw ducts 44 are added to the unit for greatly increasing the cell cooling efficiency. That increased efficiency, which is up to ten fold, leads to major increases in thermophotovoltaic cell power density, which in turn dramatically increases the economic viability of such a thermophotovoltaic unit.

The air draw ducts 44 work as follows. Without the ducts 44, heat from the cells 40 passes into the fins 42 and heats the air around the fins. The less dense heated air then rises via natural convection. The velocity of the air flow past the fins 42 is a balance between the viscous forces impeding the air flow and the buoyancy force lifting the hot air. Both of these forces are proportional to the height of the fin assembly, which is normally six inches. With the ducts 44 in place, heat from the cells 40 passes into the fins 42 and heats the air around the fins 42. The less dense heated air then rises via natural convection. The heated air then continues to rise in the duct 44, being further heated by contact with the exhaust chimney wall. The viscous force impeding air flow is still controlled by the fin height, but the buoyancy force is now much larger, being proportional to the chimney height, which can be as much as five feet. The velocity of the cooling air entering at the base 46 of the cooling fins 44 at region C is then as much as ten times higher, potentially allowing for the removal of ten times more heat.

The air draw ducts 44 are opened at their tops and bottoms. The open tops and bottoms serve to draw cool air in from near the floor and then return heated air to the room.

As shown in FIGS. 2A and 2B, the receiver 5 has a top edge 50, a bottom edge 52, side edges 54, 56, an outer surface 58, and an inner surface 60. The chimney 34 is positioned directly above the top edge 50 of the receiver 5. The ducts each have a lower part 62 and an upper part 64. The lower part 62 of each duct is positioned adjacent the outer surface 58 of the receiver 5 and the upper part 64 is positioned adjacent the chimney 34, thereby defining a channel 66 between the chimney 34 and the adjacent air draw duct 44 that extends upward from the top edge 50 of the receiver 5. The heat sink fins extend into the air draw ducts.

As shown in FIG. 3, each air draw duct 44 is preferably a generally U-shaped member having a pair of side walls 70, 72 and a boundary wall 74 extending between the side walls 70, 72. The side walls 70, 72 of the upper part 64 of each air draw duct 44 are connected to the chimney 34 and the side walls 70, 72 of the lower part 62 extend adjacent opposite side edges of the receiver 5.

Any thermophotovoltaic cell may be used in the present invention, including but not limited to GaSb, Ge, Si, GaInAs, and GaInSbAs cells. Similarly, any infrared emitter may be used, including but not limited to Pt, Pt glazed alumina rods and rare earth oxide selective emitters.

While the invention has been described with reference to specific embodiments, modifications and variations of the invention may be constructed without departing from the scope of the invention, which is defined in the following claims.

We claim:

1. A thermophotovoltaic generator apparatus comprising a hydrocarbon burner for generating a flame, an emitter positioned with respect to the hydrocarbon flame for emitting infrared radiation when heated by the flame, a receiver spaced from the emitter for receiving the infrared radiation and for converting the infrared radiation to electric power, and an exhaust chimney positioned adjacent the receiver, the chimney further comprising an open top and an open bottom.

2. The apparatus of claim 1, wherein the receiver further comprises multiple thermophotovoltaic cells connected in a circuit, wherein the cells have inner surfaces and outer surfaces and further comprising heat sinks connected to the outer surfaces of the cells wherein the heat sinks further comprise finned extensions.

3. The apparatus of claim 2, wherein the chimney extends around the heat sinks' finned extensions.

4. The apparatus of claim 3, wherein the chimney extends around the receiver such that the heat sinks finned extensions are positioned in a lower end of the chimney and an upper end of the chimney extends substantially above the receiver.

5. The apparatus of claim 2, further comprising at least one air draw duct having an open top and an open bottom, the at least one duct being positioned proximate the chimney and wherein the finned extensions of the heat sinks on the cells of the receiver extend into the at least one duct for directing heat up and away from the receiver.

6. The apparatus of claim 5, wherein the at least one air duct further comprises an upper part and a lower part, and wherein the lower part is positioned around the receiver and the upper part is positioned around the chimney such that a channel is formed between the chimney and the at least one air duct and extending upward from a top of the receiver.

7. The apparatus of claim 2, wherein the burner further comprises a fuel/air mixing tube having plural flame ports for producing a ribbon flame, and wherein the emitter comprises an elongated emitter.

8. The apparatus of claim 2, wherein the receiver further comprises thermophotovoltaic cells selected from the group consisting of GaSb cells, Ge cells, silicon cells, GaInAs cells, and GaInSbAs cells.

9. The apparatus of claim 2, wherein the emitter is selected from the group consisting of a platinum emitter, a platinum glazed alumina rod emitter, and a rare earth oxide selective emitter.

10. The apparatus of claim 1, wherein the burner further comprises a fuel/air mixing tube having plural flame ports for producing a ribbon flame, wherein the emitter comprises an elongated emitter, wherein the receiver further comprises first and second circuits of thermophotovoltaic cells positioned on opposite sides of the emitter, wherein the receiver has a top edge and a bottom edge, and wherein the chimney is positioned above the top edge of the receiver, and further comprising at least one air draw duct having an uncovered top and positioned proximate the receiver for directing heat up and away from the receiver.

11. The apparatus of claim 10, wherein the at least one duct has an upper part and a lower part, wherein heat sinks positioned on the receiver extend into the at least one duct, and wherein the lower part of the at least one duct is positioned adjacent the outer surface of the receiver and the upper part is positioned adjacent the chimney, thereby defining a channel between the chimney and the at least one air duct that extends upward from the top edge of the receiver.

12. The apparatus of claim 11, wherein the at least one air duct further comprises a generally U-shaped member having a pair of side walls and a boundary wall extending between the side walls, and wherein the side walls of the upper part of the at least one air duct are connected to the chimney and the side walls of the lower part extend adjacent opposite side edges of the receiver.

13. The apparatus of claim 12, wherein the at least one duct extends downward to an open bottom below the receiver and the fuel/air mixing tube.

14. The apparatus of claim 12, wherein the chimney is rectangular in cross-section, wherein the at least one air draw duct comprises a first duct and a second duct mounted on opposite sides of the chimney, wherein the heat sinks extend into the ducts, and wherein the lower part of the first air duct extends around the heat sinks of a first row of cells and the lower part of the second air duct extends around the heat sinks of a second row of cells.

15. The apparatus of claim 14, wherein the receiver further comprises thermophotovoltaic cells selected from the group consisting of GaSb cells, Ge cells, silicon cells, GaInAs cells, and GaInSbAs cells.

16. The apparatus of claim 14, wherein the emitter is selected from the group consisting of a platinum emitter, a platinum glazed alumina rod emitter, and a rare earth oxide selective emitter.

17. The apparatus of claim 1, wherein the burner is a heater.

18. The apparatus of claim 17, wherein the heater is a gas-fired, wall-mounted heater.

19. The apparatus of claim 18, wherein the chimney is a wall-mounted exhaust chimney.

20. The apparatus of claim 19, further comprising first and second air draw ducts having upper parts and lower parts with openings at tops and bottoms thereof, and wherein the receiver has heat sinks extending outward therefrom, wherein the chimney is positioned above the receiver, and wherein the lower parts of the ducts are positioned adjacent the outer surface of the receiver heat sinks and the upper parts are positioned adjacent the chimney, thereby defining channels between the chimney and the air draw ducts that extend upward along the chimney.

21. A heater and thermophotovoltaic generator apparatus, comprising a burner for generating a flame, an emitter positioned near the flame for emitting infrared radiation when heated by the flame, a receiver positioned around the emitter for receiving the infrared radiation and for converting the infrared radiation to electric power, an exhaust chimney positioned adjacent the receiver, and air draw ducts having upper parts and lower parts and positioned adjacent the chimney and the receiver for directing heat up and away from the receiver and away from the chimney, the chimney further comprising an open top and an open bottom, the receiver further comprising first and second circuits of thermophotovoltaic cells positioned on opposite sides of the emitter, wherein the cells have outer surfaces and heat sinks connected to the outer surfaces, wherein the chimney is positioned above the receiver cells, wherein each air draw duct further comprises a generally U-shaped member having a pair of side walls and an outer wall extending between the side walls, and wherein the side walls of the upper part of each air draw duct are connected to the chimney and the side walls of the lower parts of the air ducts extend around the heat sinks of the cells and the lower parts of the air ducts extend downward beneath the burner.

22. The apparatus of claim 21, wherein the burner is a gas-fired, wall-mounted heater further comprising a fuel/air mixing tube having multiple flame ports, wherein the emitter is an inverted V-shaped elongated emitter opening downward towards the burner, the emitter having a first section and a second section, and wherein the first section faces a first row of thermophotovoltaic cells of the receiver and the second section faces a second row of thermophotovoltaic cells of the receiver.

23. A thermophotovoltaic generation method, comprising the steps of suspending an emitter above a flame port of a burner, positioning a receiver around the emitter, positioning a chimney having an open top and an open bottom above the receiver, producing a flame by combining hydrocarbon fuel and air in the burner, heating the emitter and producing infrared energy, collecting the infrared energy in the receiver, removing heat through heat sink cooling fins extending from the receiver, converting the infrared energy to DC electric power, and drawing exhaust gases generated by the heating step and air from beneath the burner up through the chimney and over the heat sink fins for cooling the receiver.

24. The method of claim 23, wherein the drawing step further comprises the steps of drawing air upward through the burner, lifting hot exhaust gases away from the receiver, and increasing velocities of air flows past the cooling fins.

25. The method of claim 23, further comprising the steps of positioning air ducts adjacent the chimney and the receiver, positioning the heat sink fins in the air ducts and heating air in the air ducts with heat removed from the cooling fins and from the chimney.

* * * * *